(12) United States Patent  
Perlin et al.

(10) Patent No.: US 11,836,285 B2
(45) Date of Patent: Dec. 5, 2023

(54) SYSTEM FOR A SPECTATOR TO VIEW A VIRTUAL REALITY OF A PERFORMER AND METHOD

(71) Applicants: Kenneth Perlin, New York, NY (US); Fengyuan Zhu, New York, NY (US)

(72) Inventors: Kenneth Perlin, New York, NY (US); Fengyuan Zhu, New York, NY (US)

( * ) Notice: Subject to any disclaimer, the term of this patent is extended or adjusted under 35 U.S.C. 154(b) by 0 days.

(21) Appl. No.: 15/915,868

(22) Filed: Mar. 8, 2018

(65) Prior Publication Data

US 2018/0260023 A1 Sep. 13, 2018

Related U.S. Application Data

(60) Provisional application No. 62/469,921, filed on Mar. 10, 2017.

(51) Int. Cl.
| | |
|---|---|
| *G06F 3/01* | (2006.01) |
| *G06F 1/16* | (2006.01) |
| *G06F 3/0488* | (2022.01) |
| *H04W 88/02* | (2009.01) |
| *H04W 84/12* | (2009.01) |

(52) U.S. Cl.
CPC .............. *G06F 3/012* (2013.01); *G06F 1/163* (2013.01); *G06F 1/1626* (2013.01); *G06F 1/1694* (2013.01); *G06F 3/011* (2013.01); *G06F 3/0488* (2013.01); *H04W 84/12* (2013.01); *H04W 88/02* (2013.01)

(58) Field of Classification Search
CPC ........ G06F 3/011; G06F 3/012; G06F 1/1626; G06F 1/163; G06F 1/1694; G06F 3/0488; G02B 27/017; H04W 84/12; H04W 88/02
See application file for complete search history.

(56) References Cited

U.S. PATENT DOCUMENTS

| | | | |
|---|---|---|---|
| 2015/0243078 A1* | 8/2015 | Watson | G02B 27/2228 345/547 |
| 2017/0011554 A1* | 1/2017 | Burba | G06T 15/20 |
| 2017/0163970 A1* | 6/2017 | Gronholm | G03B 37/04 |
| 2017/0192496 A1* | 7/2017 | Balslev | G06F 3/011 |
| 2017/0249785 A1* | 8/2017 | Hooper | G06F 3/016 |
| 2018/0096519 A1* | 4/2018 | Tokubo | A63F 13/211 |

* cited by examiner

*Primary Examiner* — Matthew A Eason
*Assistant Examiner* — Chayce R Bibbee
(74) *Attorney, Agent, or Firm* — Ansel M. Schwartz

(57) ABSTRACT

A system for a spectator to view a virtual reality of a performer includes a head mounted display worn by the performer which produces the virtual reality for the performer to see while wearing the head mounted display. The system includes an audience portion having an audience display for an audience member which receives input signals from a network corresponding to the virtual reality being viewed by the performer on the head mounted display and displays these input signals on the audience display for the spectator to view. A method for a spectator to view a virtual reality of a performer.

12 Claims, 2 Drawing Sheets

SYSTEM FOR A SPECTATOR TO VIEW A VIRTUAL REALITY OF A PERFORMER AND METHOD

CROSS-REFERENCE TO RELATED APPLICATIONS

This is a nonprovisional of U.S. provisional application Ser. No. 62/469,921 filed Mar. 10, 2017, incorporated by reference herein.

FIELD OF THE INVENTION

The present invention is related to a spectator using a display of a mobile phone to view a virtual reality on a head mounted display worn by a performer. (As used herein, references to the "present invention" or "invention" relate to exemplary embodiments and not necessarily to every embodiment encompassed by the appended claims.) More specifically, the present invention is related to a spectator using a display of a mobile phone to view a virtual reality on a head mounted display worn by a performer wherein the virtual reality displayed on the audience display of the smart phone corresponds to an actual position and orientation of the spectator in a room in which the performer having the head mounted display and the spectator are located.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In their current stage, virtual reality experiences can be very isolating. An audience member present in a room who is watching someone else wearing a Head Mounted Display (HMD) can have very little interaction with the person wearing the virtual reality HMD. By combining each audience member's mobile phone with the virtual reality HMD via a local network, the current invention enables a custom spectator view of the virtual reality experience for each spectator, whereby the view of that spectator can be correctly positioned and oriented in the scene in a way that corresponds to that audience member's actual position and orientation in the room.

BRIEF SUMMARY OF THE INVENTION

The present invention pertains to a system for a spectator to view a virtual reality of a performer. The system comprises a head mounted display worn by the performer which produces the virtual reality for the performer to see while wearing the head mounted display. The head mounted display having a head mounted computer which produces the virtual reality on the head mounted display and has a transmitter for sending output signals corresponding to the virtual reality appearing on the head mounted display. The system comprises a network which receives the output signals from the head mounted display corresponding to the virtual reality being viewed by the performer. The network in communication with the head mounted display. The system comprises an audience portion having an audience display for the spectator which receives input signals from the network corresponding to the virtual reality being viewed by the performer on the head mounted display and displays these input signals on the audience display for the spectator to view. The audience portion having an audience computer which displays the input signals on the audience display and an audience receiver which receives the input signals from the network. The audience portion in communication with the network.

The present invention pertains to a method for a spectator to view a virtual reality of a performer. The method comprises the steps of linking a telecommunications network to a smart phone of the spectator and a head up display worn by a performer that displays the virtual reality. There is the step of viewing on an audience display of the smart phone by the spectator the virtual reality that appears on the head mounted display.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
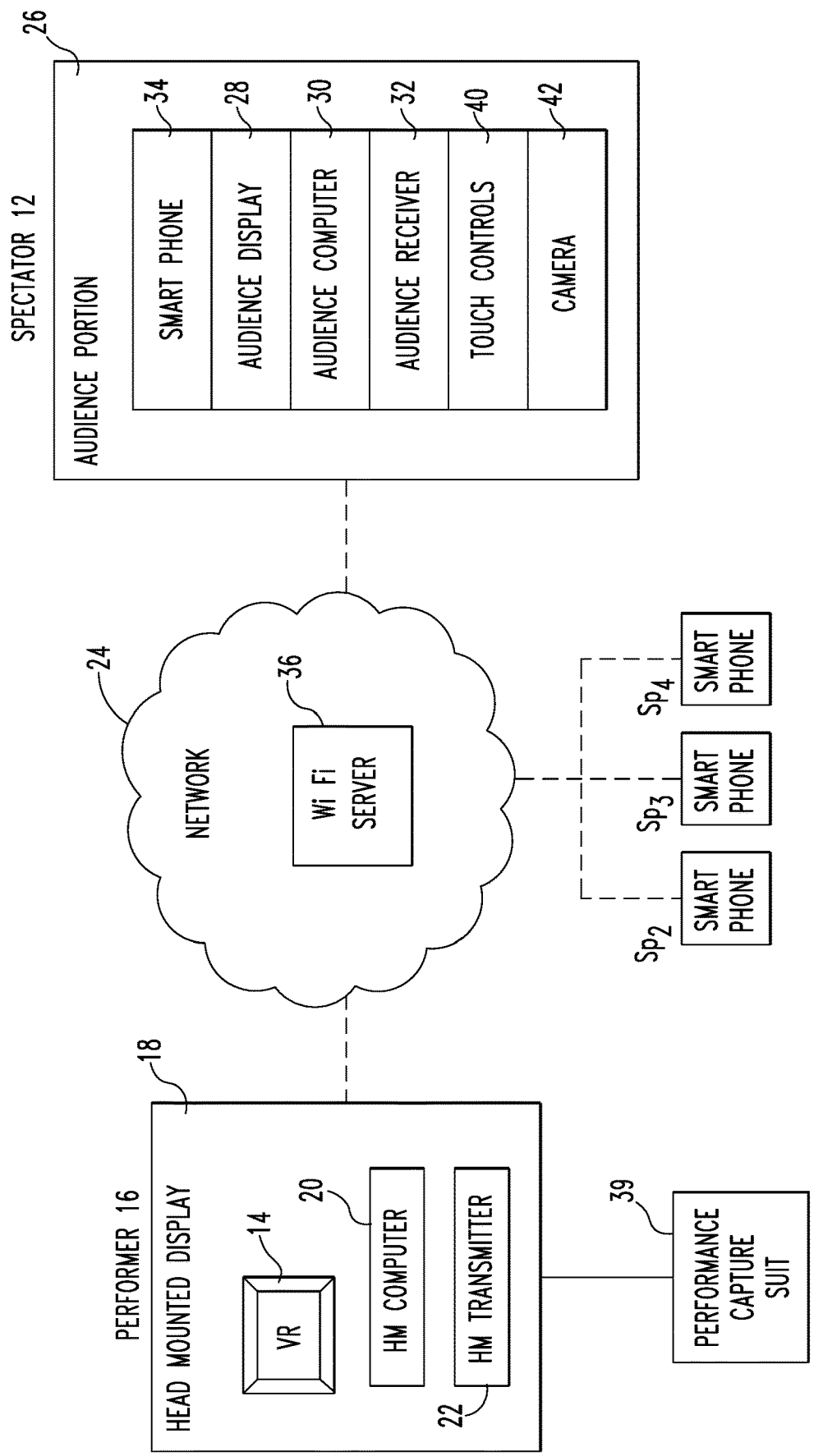
FIG. 1 is a block diagram of the present invention.

Referring now to the drawings wherein like reference numerals refer to similar or identical parts throughout the several views, and more specifically to FIG. 1 thereof, there is shown a system 10 for a spectator 12 to view a virtual reality 14 of a performer 16. The system 10 comprises a head mounted display 18 worn by the performer 16 which produces the virtual reality 14 for the performer 16 to see while wearing the head mounted display 18. The head mounted display 18 having a head mounted computer 20 which produces the virtual reality 14 on the head up display and has a head mounted transmitter 22 for sending output signals corresponding to the virtual reality 14 appearing on the head mounted display 18. The system 10 comprises a network 24 which receives the output signals from the head mounted display 18 corresponding to the virtual reality 14 being viewed by the performer 16. The network 24 in communication with the head mounted display 18. The system 10 comprises an audience portion 26 having an audience display 28 for the spectator 12 which receives input signals from the network 24 corresponding to the virtual reality 14 being viewed by the performer 16 on the head mounted display 18 and displays these input signals on the audience display 28 for the spectator 12 to view. The audience portion 26 having an audience computer 30 which displays the input signals on the audience display 28 and an audience receiver 32 which receives the input signals from the network 24. The audience portion 26 in communication with the network 24.

The audience portion 26 may include a mobile smart phone 34. The virtual reality 14 displayed on the audience display 28 of the smart phone 34 may correspond to an actual position and orientation of the spectator 12 in the room in which the performer 16 having the head mounted display 18 and the spectator 12 are located. The system 10 may include multiple spectators 12 each having their own smart phones which display on their audience display 28 of their smart phones the virtual reality 14 which corresponds to their actual position and orientation in the room.

The network 24 may include a Wi-Fi server that produces position and orientation updates of the performer 16. The smart phone 34 of the spectator 12 may compute a position and orientation of the smart phone 34 with respect to the room and then concatenate's transformations of the performer 16 and the smart phone 34, using matrix multiplication, to compute a time varying position and orientation of the room and therefore of the performer 16 having the head mounted display 18 with respect to the smart phone 34 has a smart phone 34 moves and rotates in space through time. The performer 16 may make changes to the virtual reality 14. The performer 16 may wear a performance capture suit to make changes to the virtual reality 14.

The smart phone 34 may have touch controls and the spectator 12 uses touch controls on the smart phone 34 to change a view of the virtual reality 14 appearing on the audience display 28 which differs from the position and orientation of the smart phone 34 in the room. The spectator 12 may use the touch controls on the smart phone 34 to make changes to the virtual reality 14. A video flow captured from a camera of the smart phone 34 may be used as an environment layer in the virtual reality 14.

The present invention pertains to a method for a spectator 12 to view a virtual reality 14 of a performer 16. The method comprises the steps of linking a telecommunications network 24 to a smart phone 34 of the spectator 12 and a head up display worn by a performer 16 that displays the virtual reality 14. There is the step of viewing on an audience display 28 of the smart phone 34 by the spectator 12 the virtual reality 14 that appears on the head mounted display 18.

The audience portion 26 may include a mobile smart phone 34. There may be the step of displaying the virtual reality 14 on the audience display 28 of the smart phone 34 corresponding to an actual position and orientation of the spectator 12 in the room in which the performer 16 having the head mounted display 18 and the spectator 12 are located.

Figure 2:
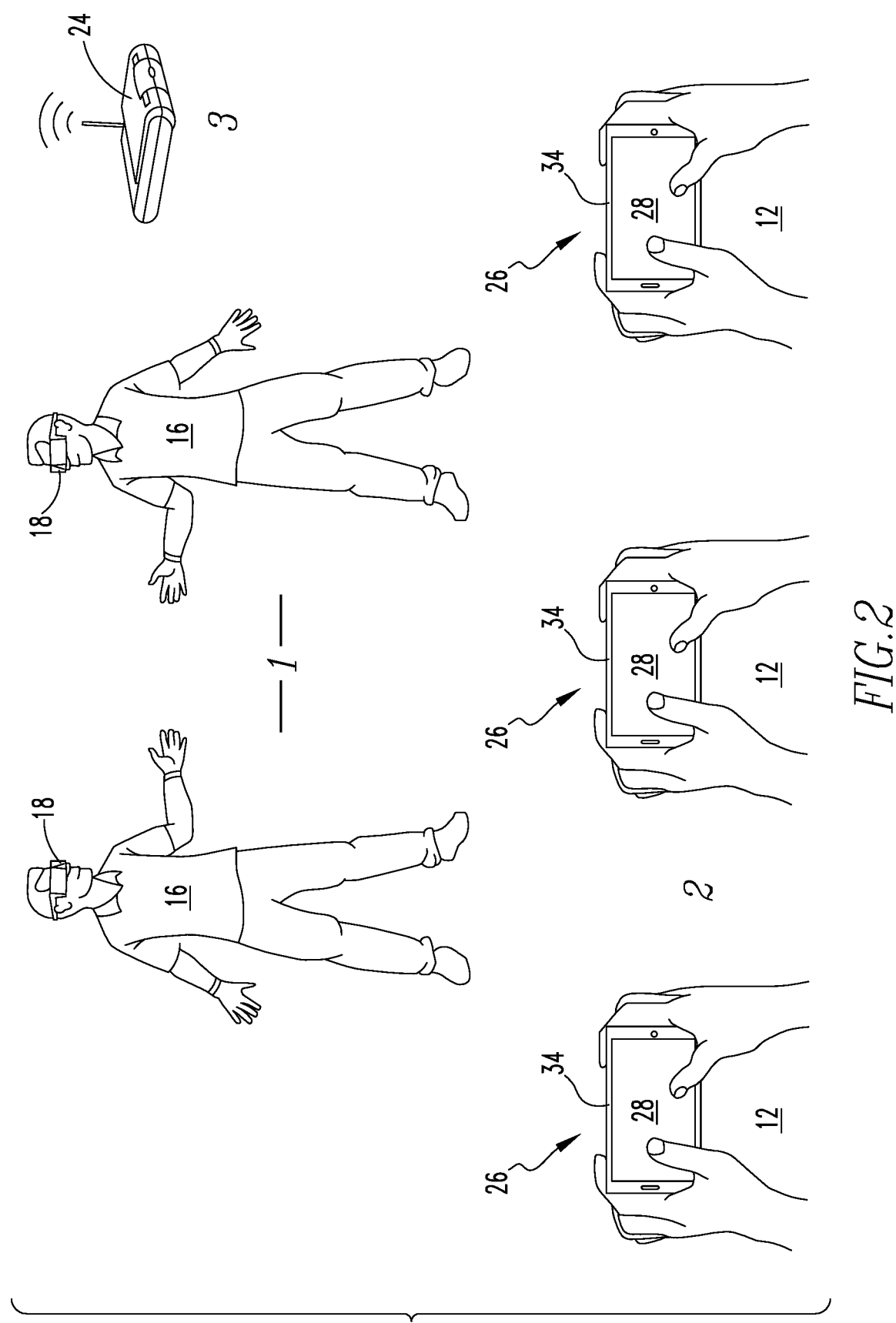
FIG. 2 is a representation of a spectator and a performer with a head mounted display having a virtual reality.

In the operation of the invention and with reference to FIG. 2:

1—VR users as performers: Each person wearing a VR device, such as an HMD, which can in one embodiment be a VIVE Virtual Reality system and an MSI computer worn in a backpack, and in another embodiment can be a person wearing a performance capture suit, using one of various standard methods for performance capture, while wearing a head-mounted VR device, such as a GearVR running a real-time simulation using standard software such as the Unity Game Engine, which is continually receiving positional updates from a Wifi server, can act as a performer 16 in the room.

2—People with smartphones as spectators: Each person holding a smartphone can experience the performance as a spectator 12, seeing into a shared virtual world through the screen of their phone in a way that corresponds to their actual position and orientation in the room. The position and orientation of each VR actor is provided to a server computer over the shared wireless network 24 using a standard data protocol for describing position and orientation such as is provided with the Vive virtual reality system or by the Optitrack motion capture system. This provides a base position and orientation that is independent of the position of any given observer. Because the software on the phone is able to compute the position and orientation of the phone itself with respect to the room, the software on the phone is then able to concatenate the transformations of the actor and the phone itself, using standard Matrix multiplication, to compute the time varying position and orientation of the room and therefore of the VR actor participant with respect to the phone, as the phone moves and rotates in space through time.

3—Wireless local network 24, such as Wifi: The positional data from all performers is sent via the wireless local network 24 to each spectator's smartphone.

People with smartphones are inside-out tracked, moving around, change views: Each smartphone is running software that does inside out tracking to determine the current position and orientation of that smartphone.

The inside out tracking, which is known in the art to identify the location and orientation of the phone, allows the phone to compute without the use of any external markers in the room the time varying position and orientation of the phone as it moves through the room.

In one embodiment, this tracking is affected by sensor fusion between (a) the Inertial Measurement Unit (IMU) in the smartphone to perform rapid updates of position and orientation and (b) a standard SIFT algorithm to locate features in the room and use those features to determine a ground truth of position and orientation.

The sensor Fusion algorithm breaks up the problem of tracking the position and orientation of the phone within the room into two sub problems. One sub problem is determination of the absolute position and orientation of the phone in the room. This can be implemented by a standard Vision algorithm such as SIFT, which looks at ambient visual markers such as corner points of objects and corners of the room and uses the variations in visual position of those markers over time to compute a Time varying Matrix which gives the movement of the phone through the room. A SIFT algorithm may not be sufficient for high-quality performance because it is limited by the frame rate and resolution of the phone's camera. For this reason, Sensor Fusion is employed with the solid state gyroscope which is part of the IMU in the phone. The IMU gyroscope is able to operate at a much higher frame rate and therefore is able to fill in the short intervals of time between camera measurements by sending small time varying changes in orientation and adding those as offsets to the orientation computed by the SIFT algorithm.

Hover mode, virtual buttons to moving around: Optionally the spectator 12 can use touch controls on their phone's touch sensitive screen to move their view into the virtual version of the shared world to a position and orientation that differs from their actual position and orientation in the room.

Interaction among people with mobiles and VR HMDs: Each spectator 12 can optionally also use the touch controls on their phone's touch sensitive screen to communicate changes in the shared virtual scene, such as the position of virtual objects or interactively animated creatures, through the wireless local network 24, so that those changes are seen by the performers in the VR space, as well as by other spectators.

Structure of the System 10

In the system 10, there are two groups of users. One group of users can be called "VR users", who will use a Head-mounted display such as an HTC Vive, Oculus or other kind of similar device, which can track both the user's position and orientation. The other group can be called "mobile device" users, who will use mobile phones or tablets as their interface to the experience. Both types of users share the same virtual world via a multiplayer based application on their devices and are also physically collocated during the experience.

On the software side, there is a pipeline for one or more of the users of either or both of these two types of these users to share the same experience at the same time. Generally speaking, the application software is generated by commonly available runtime software engines such as (but not limited to) Unity, Unreal and WebGL (Unity is a 3D game engine to build up 3D games and experience, which is under the Unity Company[website link: https://unity3d.com/]; Unreal is something similar to Unity, [website link: https://www.unrealengine.com/en-US/what-is-unreal-engine-4]); WebGL is a royalty-free web standard for a low-level 3D graphics API based on OpenGL ES and used for browser based rendering [wikipedia: https://en.wikipedia.org/wiki/WebGL]. These tools have the capability to support 3D rendering on VR devices and mobile devices. Also, these applications need to be set up using commonly available multiplayer application logic to link the users via a shared network 24. Details beyond these common multiplayer applications which are added to these existing multiplayer applications are:

Tracking Solutions

Since all users are sharing both the physical and virtual world, it is necessary to know where the users are located. For the VR users, it is common in the industry to provide at least head position and orientation tracking for them. For this purpose, different products take usage of multiple ways to do so. For HTC Vive [https://www.vive.com/us/] uses the Lighthouse system, whereas Oculus[https://www.oculus.com/] uses fixed-position cameras that track infrared markers on the headset. There are also inside-out tracking based on cameras and Inertial measurement unit, such as is used by the Vive Focus[https://www.vive.com/cn/product/vive-focus-en/]. Those tracking technologies are applied to the mobile devices. But in general, the tracking solutions on mobile smartphones will be more based on inside-out approaches since the mobile phones already have built-in cameras and imu. Those solutions can currently be provided via third party libraries such as ARKit [ARkit is a common library for inside-out tracking in mobile phone, under IOS, owned by Apple, link: https://developer.apple.com/arkit/], ARCore [ARCore is a common library for inside-out tracking in mobile phone, under Android, owned by Google link:https://developers.google.com/ar/], ARToolkits[https://artoolkit.org/, similar to the above things but open-source], Vuforia[https://www.vuforia.com/, similar to the resources above but not open source], or implemented based on open-source solutions such as VINs [https://github.com/HKUST-Aerial-Robotics/VINS-Mono].

Network 24 Sync-Up, Events

Since the experience is multiplayer based, it will require a network 24 solution to sync-up all users on the same page. It is common in the industry to sync-up all users into the same shared virtual world during the multiplayer experience. The features that are added to existing software are:

Sync up physical locations based on the VR users and Mobile users together;

Sync up touch-events from Mobile users and controller events from VR users together;

Sync up necessary virtual events (i.e., changes of Virtual objects, variations in the virtual avatars which presents other users).

The set-up of the network 24 can be a server-client based set-up which includes a server run in the back end to receive and broadcast to all clients, or can be some other method used in existing multiplayer games (such as point to point mesh networks).

Coordinator Synchronization

To generate the co-located experience among the VR users and Mobile users, it is necessary to sync up their coordinate systems with their physical locations and virtual worlds. Details of the methods for this are described below as follows:

Set up an origin point in the physical space as the (0,0,0) point in each user's view of the virtual world. Since the physical position for each device based on the tracking system 10 is known, this origin point in multiple devices is synchronized as the common origin point.

Since the units in the real world are in length units like meters and the units in the virtual world are in dimensionless numbers, to match those units it is necessary to set a ratio for conversion. Here the conversion constant "a" is defined, to match a meter length in the physical world to a dimensionless unit length in the virtual world.

If the user is in the world coordinates as (x(meter), y(meter), z(meter)), his represented position in the virtual world will be (ax, ay, az). Then, as a matter of convention, taking a=1, keeps 1 meter=1 units. "a" can also be defined as any real number. The orientation of the user will be in the same units in the physical world and the virtual world.

Based on the ratio "a" defined above and the tracking data, now all the users' projected positions in the virtual world are known. For one user, the avatars in other users in their proper positions (which is not necessary) can be rendered, and that user's virtual camera view can be set-up into the shared world based on that user's location and orientation.

To set-up the Field-Of-View of the virtual camera, each VR user's camera FOV is matched to their HMD's target FOV. However, if the Mobile users are just rendering the virtual world, the FOV for them can be arbitrary. For best practice, a FOV of approximately 100 degrees will seem natural for the experience, but that limitation is not necessary. As an example, the Holodoodle project as a case can be used.

In the Holodoodle set-up, there is a virtual party in the virtual world. The VR users will see the whole set-up of the party: Everyone will become robotic-look like avatars, on a stage with visual effects decorated elements. They can use their hands to interact with the environment, i.e. open up the virtual light on the stage or launch a firework with their hands and the controller. For the VR users, the experience is totally immersive.

For the mobile phone users, instead of experience the immersive version like the VR users, they will see everything on their mobile device. The screen will look like a filter to show the "virtual world" to them. That is to say: If they are using the mobile device targeting to the VR users, they will see the robotic style avatars like them; if they holding the mobile device to walk around, their perspective view will change, just like they are walking inside the VR world. Things will be similar to the Mobile users, as they turn on the camera on the mobile phone to walk in the real world, the difference will just be that all the things they are experiencing will be in the virtual world. Their interaction towards the virtual world will be mostly achieved by touching the screen, like if they want to launch the firework, after they selected the commands on the screen, from the touch point a raycast towards the virtual world will be introduced, and then trigger the events on the virtual worlds. The Mobile Users will also have avatars in the virtual worlds, and can also be seen by VR users and Mobile Users.

Extension Cases

Here a description has been made of a system 10 having "VR" users and "mobile device users. This description can be extended. The "VR users" can be extended to be "a user with a head mounted display 18 which is tracked in its position and orientation." In this case, if the users are using some mixed reality devices such as Hololens Hololens [Owned by Microsoft, a mixed reality device which allow users to see the holographics in the 3D space and under inside-out tracking. Link here: https://www.microsoft.com/en-us/hololens] and Meta[similar to Hololens, but owned by Meta company. Link here: http://www.metavision.com/], they can still be defined as "VR Users," since they are using positional trackable HMD-based devices. The "Mobile device Users" do not need to be limited to just use a mobile phone, a device such as a tablet with tracking capability can also be used.

The position tracking does not always need to be extremely accurate. For example, if the mobile users are placed in a theater environment, it is not necessary to track the mobile users' position if they are sitting in a seat. Since the location of each seat is known already, their position can be set based on their seat position. The same logic can be applied to the VR users if they are only using DOF devices with orientation. [This means the VR devices don't have the positional tracking itself, but just have the orientation tracking] If their locations can be estimated due to some physical set-up such as their seat location, then this position information can just be used.

For the mobile phone users, partially rendering of virtual world objects is also available. Based on how the experience is designed, the mobile phone experience can also be made as "Mixed Reality", which in general is a video see-through experience to merge the VR experience and the real world together.

In order to achieve those "Mixed Reality" experiences, the change of the mobile users' application will be:
1. Using the camera on the mobile phone to capture the video flow of the real world and set up the video flow captured from the camera as the "environment layer" in the applications.
2. Adding on the essential virtual objects and the virtual avatars on top of the environment layers, rather than rendering all the components in the VR world, in order to make the video see-through effects act like a "Mixed Reality" experience. Methods (On the mobile side, no difference on the VR side or on the server side):

In the application side, using the camera as an input, using the camera captured frames as a texture, rendering this layer as the background layer on the applications.

On the development stage, all the tags on different objects, i.e. environments, background, interactable objects, avatars, so on will need to be made.

Based on the tags that were presetted, on the Mixed Reality modes, not everything from the virtual world will be rendered; the whole environment, the background of the VR world won't be rendered, but the interactable objects and the avatars will be rendered on the correct projection.

In order to match the camera on the mobile phone and the virtual camera, the virtual cameras on the mobile users' side need to be set as the same Field-Of-View as the camera on the mobile phone. The methods are as follows:

Obtaining the Field-Of-View from the camera is not difficult. Most of the cameras on current phones will provide the FOV in the system parameters. (If not provided, measure this with modern optical methods is straight forward, which is not essential in this loop.)

In the Mobile users, a virtual camera needs to be set up in the game scene to render everything. And the FOV is one of the important parameters on this class. Simply set the FOV parameters to be totally the same as the FOV of the physical device.

If the mobile phone has the ability to obtain depth information from the environment, it can be chosen to apply occlusion from the video layers to the virtual objects. In which, the methods will be:

Based on the depth information we've got from the depth sensors in the mobile device, determine the relationship of if the physical world objects is blocking the virtual world objects.

If the virtual world objects are blocked, don't render the occlusion part based on the depth information.

Here is an example as for the Holodoodle:

For the VR users, they experience the same thing.

But for the Mobile Users, once they are taking usage of the "Mixed Reality" experience, on the mobile device side, they won't render the virtual stage, but just see the real world based on their camera on the phone. The avatars and virtual objects will still be rendered and under the same perspective of views, and added on the real world layers.

3. If the mobile phone has the ability to obtain depth information from the environment, occlusion can be applied from the video layers to the virtual objects.

STEP BY STEP OPERATION BY USER:
1. In an optional initial set-up stage, the location and orientation of each spectator 12 can be aligned within the room.
2. The smartphone of each spectator 12 is linked to the same Wifi network 24.
3. An application that performs the position and orientation tracking, as well as showing the shared virtual world on the smartphone screen, is downloaded through the wireless network 24 onto the spectator's phone. Optionally, this downloading can be done beforehand in any location.
4. Each spectator 12 runs the application that supports the shared virtual experience.

EXAMPLE USE OF INVENTION

One example project that would be able to benefit from this invention is a shared "drawing in the air" application, in which each VR performer is drawing a virtual 3D drawing in the air, as has been previously demonstrated by Google's TiltBrush VR application. In this example use, all spectators 12 would be able to walk around the room and see these 3D drawings as though they are physical objects in the room, and as though the spectator 12 is viewing that virtual physical object in its proper position and orientation, as seen from the spectator's location.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for a spectator to view a virtual reality of a performer comprising:
   a head mounted display worn by the performer which produces the virtual reality for the performer to see while wearing the head mounted display, the head mounted display having a head mounted computer which produces the virtual reality on the head mounted display and has a head mounted transmitter for sending output signals corresponding to the virtual reality appearing on the head mounted display;

a network which receives the output signals from the head mounted display corresponding to the virtual reality being viewed by the performer, the network in communication with the head mounted display; and an audience portion having an audience display for the spectator which receives input signals from the network corresponding to the virtual reality being viewed by the performer on the head mounted display and displays these input signals on the audience display for the spectator to view, the audience portion having an audience computer which displays the input signals on the audience display and an audience receiver which receives the input signals from the network, the audience portion in communication with the network, the virtual reality displayed on the audience display corresponds to a choice by the spectator using the audience portion of either an actual current position and orientation of the spectator in a room in which the performer having the head mounted display and the spectator are located or to an actual position and orientation in the room that differs from an actual position and orientation of the spectator in the room, the actual position based on an origin point in the room, the origin point independent of the position of the spectator, the spectator using the audience portion to communicate changes in the shared virtual reality so that those changes are seen by the performer in the virtual reality.

2. The system of claim 1 where the audience portion includes a mobile smart phone.

3. The system of claim 2 including multiple spectators each having their own smart phones which display on their audience display of their smart phones the virtual reality which corresponds to their actual position and orientation in the room.

4. The system of claim 3 wherein the network includes a Wi-Fi server that produces position and orientation updates of the performer.

5. The system of claim 4 wherein the smart phone of the spectator computes a position and orientation of the smart phone with respect to the room and then concatenate's transformations of the performer and the smart phone, using matrix multiplication, to compute a time varying position and orientation of the room and therefore of the performer having the head mounted display with respect to the smart phone as a smart phone moves and rotates in space through time.

6. The system of claim 5 wherein the performer makes changes to the virtual reality.

7. The system of claim 6 wherein the performer wears a performance capture suit to make changes to the virtual reality.

8. The system of claim 7 wherein the smart phone has touch controls and the spectator uses touch controls on the smart phone to change a view of the virtual reality appearing on the audience display which differs from the position and orientation of the smart phone in the room.

9. The system of claim 8 wherein the spectator uses the touch controls on the smart phone to make changes to the virtual reality.

10. The system of claim 9 wherein a video flow captured from a camera of the smart phone is used as an environment layer in the virtual reality.

11. A method for a spectator to view a virtual reality of a performer comprising the steps of:

linking a telecommunications network to a smart phone of the spectator and a head mounted display worn by a performer that displays the virtual reality;

viewing on an audience display of the smart phone by the spectator the virtual reality that appears on the head mounted display, including the step of displaying the virtual reality on the audience display of the smart phone corresponding to a choice by the spectator using the audience portion of either to an actual current position and orientation of the spectator in the room in which the performer having the head mounted display and the spectator are located or to an actual position and orientation in the room that differs from an actual position and orientation of the spectator in the room, the actual position based on an origin point in the room, the origin point independent of the position of the spectator; and the spectator using the audience portion to communicate changes in the shared virtual reality so that those changes are seen by the performer in the virtual reality.

12. The method of claim 11 where the audience portion includes a mobile smart phone.

* * * * *